United States Patent [19]

Kuo et al.

[11] Patent Number: 5,529,699

[45] Date of Patent: Jun. 25, 1996

[54] WATER-SOLUBLE CATIONIC COPOLYMERS AND THEIR USE AS FLOCCULANTS

[75] Inventors: Lawrence L. Kuo, Columbia; Roger Y. Leung, Ellicott City; Kenneth S. Williams, Baltimore, all of Md.

[73] Assignee: W. R. Grace & Co.-Conn., New York, N.Y.

[21] Appl. No.: 423,117

[22] Filed: Apr. 18, 1995

Related U.S. Application Data

[63] Continuation-in-part of Ser. No. 309,513, Sep. 20, 1994, abandoned, which is a continuation of Ser. No. 150,293, Nov. 12, 1993, abandoned.

[51] Int. Cl.$^6$ .......................... B01D 21/01; C08F 26/08; C08F 20/54
[52] U.S. Cl. ..................... 210/735; 526/263; 526/291; 526/307.1; 524/922
[58] Field of Search .................................. 526/263, 291, 526/307.1; 210/735; 524/922

[56] References Cited

U.S. PATENT DOCUMENTS

| | | | |
|---|---|---|---|
| 4,749,444 | 6/1988 | Lorz et al. | 162/168.3 |
| 4,774,022 | 9/1988 | Sumi et al. | |
| 4,774,285 | 9/1988 | Pfohl et al. | 525/60 |
| 4,808,683 | 2/1989 | Itagaki et al. | 526/307.2 |
| 4,957,977 | 9/1990 | Itagaki et al. | 525/328.4 |
| 5,037,927 | 8/1991 | Itagaki et al. | 526/307.7 |
| 5,098,521 | 3/1992 | Freudenberg et al. | 162/168.2 |
| 5,225,088 | 7/1993 | Moench et al. | 210/734 |

FOREIGN PATENT DOCUMENTS

| | | | |
|---|---|---|---|
| 2054518 | 5/1992 | Canada . | |
| 235893 | 9/1987 | European Pat. Off. . | |
| 0464957 | 1/1992 | European Pat. Off. | 526/263 |

OTHER PUBLICATIONS

Hawley's Condensed Chemical Dictionary Feb. 12, 1991—p. 528.
"Polyvinylamine—A New Class of Polymers For Paper Production With a Range of Environment–Friendly Characteristics", by F. Linhart and W. Auhorn, in Das Papier, No. 10A, 1992, pp. V38–V45. (Translation of a German Article).
1046 TMOG 2 "Official Gazette" Sep. 4, 1984.

*Primary Examiner*—Joseph L. Schofer
*Assistant Examiner*—N. Sarofin
*Attorney, Agent, or Firm*—Howard J. Troffkin

[57] ABSTRACT

A method of flocculating coagulated and/or finely divided suspended matter in aqueous systems comprising adding to the system from 0.005 to 1 weight percent based on the dry weight of the coagulated and/or finely suspended matter of at least one water soluble cationic polymer selected from a water soluble cationic copolymer (I) composed of the polymerization reaction of an N-vinylamide with at least one cationic quaternary amine monomer.

8 Claims, No Drawings

WATER-SOLUBLE CATIONIC COPOLYMERS AND THEIR USE AS FLOCCULANTS

This application is a continuation-in-part of U.S. application Ser. No. 08/309,513 filed Sep. 20, 1994, now abandoned, which, in turn, is a continuation of U.S. application Ser. No. 08/150,293 filed Nov. 12, 1993, now abandoned.

FIELD OF THE INVENTION

This invention relates to certain novel cationic water soluble copolymers derived from N-vinylamide monomers and cationic quaternary amine comonomers, and to their use as flocculants. The copolymers of this invention are particularly useful in papermaking processes and, more particularly, as part of retention and drainage aids for use in papermaking systems.

BACKGROUND OF THE INVENTION

The flocculation of suspended matter in water to enhance clarification rates is an important aspect of industrial and municipal water treatment. Flocculation is the agglomeration of coagulated colloidal and finely divided suspended matter by physical mixing or chemical coagulant aids. Polymeric organic coagulants such as cationic polyamines and high molecular weight polyacrylamides have been used to aid in flocculation and are often used in combination with inorganic coagulants such as lime, alum, ferric chloride, ferrous sulfate, ferric sulfate and sodium aluminate.

Cationic copolymers are used in such applications as flocculating agents, paper treating agents, and the like. Conventionally known cationic copolymers include copolymers of metal or ammonium salts of dialkylaminoalkyl-(meth)acrylates, and Hofmann degradation or Mannich reaction products of polyacrylamides. Recently, considerable research effort has been devoted to developing vinylamine containing copolymers by copolymerizing and modifying copolymers of N-vinylamide.

While many polymeric materials can be used effectively as flocculants for clarifying water streams containing suspended matter, only certain of these copolymers are effective as drainage/retention aids in the manufacture of paper or paperboard. Retention is a term used in papermaking to denote the extent to which the pulp fibers and other additives which are added to the furnish are retained in the finished paper. The retention of pulp fibers, fines, sizing agents, fillers and other additives in the paper sheet during its formation in a paper making machine is an important problem. A retention aid generally acts by increasing the flocculating tendency of the pulp fibers and additives to inhibit their loss during drainage through the paper machine wires or screens.

Numerous factors affect the efficiency of retention aids including 1) variables in the furnish such as pH, consistency, temperature, type of pulp fiber (e.g., fiber length, degree of refining, etc.), and white water recirculation (e.g. degree of system closure), 2) conditions of the wire or screens such as wire mesh size, machine speed, etc. and 3) factors relating to the additives such as the dosage amount of additives, order of additives, form, shape and density of particles and ionic balance.

Drainage is another papermaking requirement, that often conflicts with retention, and requires a rapid reduction in water content of an aqueous pulp suspension in the sheet forming areas of a paper machine. Aqueous pulp suspensions contain more than 99% water. To convert an aqueous pulp suspension to a finished paper sheet requires a rapid reduction in water content to a level of about 6%. Drainage rates are dependant upon numerous factors including the arrangement of the drainage elements in the paper making machine, (e.g., arrangement of free drainage areas vis-a-vis vacuum assistance area), characteristics of the wires, screens or fabric, furnish characteristics (e.g. freeness, additives, etc.), furnish thickness, temperature, furnish consistency and wire speed. Suitable retention/drainage aids must not only inhibit the undue loss of fibers and additives, but they must also promote rapid drainage of water from the pulp suspension. Numerous retention/drainage aids are known and are available to paper makers.

EP 235,893 describes the use of a combination of organic, substantially linear synthetic polyacrylamide copolymers and bentonite to improve drainage/retention. Suitable organic copolymers are those which provide a bridging mechanism for flocculation. Suitable copolymers are disclosed as having charge densities from 0.35 to 2.5 mEq/gm, and molecular weights above 500,000, preferably above 1 million and often above 5 million, most preferably in the range 10 to 30 million or more. However, these high molecular weight copolymers are provided to paper makers in the form of a solid material which is slow to dissolve in aqueous systems. In addition, high molecular weight copolymers are very shear-sensitive, which present significant handling and quality control problems. For example, since the copolymers must be pre-dissolved in an aqueous solution, extensive mixing is required to assure complete dissolution. However, since these copolymers are sensitive to shearing, mixing procedures which are adequate to assure dissolution often destroy the desirable high molecular weight characteristics as well as overall uniformity of the final polymeric dispersion.

U.S. Pat. No. 4,749,444 discloses a process for production of paper and cardboard by adding to the paper stock a three component mixture comprising an activated bentonite, a cationic polyelectrolyte having a charge density not less than 4 mEq/gm and a high molecular weight acrylamide or methacrylamide copolymer having an average molecular weight from 1 to 20 million. This reference discloses that if less than all three components are used, i.e., if only bentonite and cationic polyelectrolyte are used, the drainage of the paper stock is poor or if only bentonite and high molecular weight copolymer are used, the paper stock flocculates to such an extent that satisfactory sheet formation is not ensured.

*Linhart and Auhorn*, in Das Papier, No. 10A, 1992, pp. v38–v45, discloses the use of polyvinylamines as a new class of copolymers for paper production.

U.S. Pat. No. 5,098,521 discloses a process for paper and board production which uses a paper stock containing anionically charged foreign substances by adding to the paper stock N-vinylamide/vinylamine copolymers having less than 10% vinylamine units and having K values of not less than 130 (as determined according to H. Fikentscher).

U.S. Pat. No. 4,774,285 discloses vinylamine containing copolymers by copolymerizing N-vinylformamide with an ethylenically unsaturated monomers such as vinyl acetate, vinyl propionate, $C_1$ to $C_4$ alkyl vinyl ethers, the esters, nitriles and amides of (meth)acrylic acid and N-vinylpyrolidone and then hydrolyzing the copolymers. These copolymers are used in papermaking to increase the strength of paper.

U.S. Pat. No. 4,808,683 discloses copolymers containing vinylamine, N-vinylformamide and N-monosubstituted or N,N-disubstituted acrylamide for use as flocculating agents, drainage aids and paper strength increasing agent.

U.S. Pat. No. 4,957,977 and U.S. Pat. No. 5,064,909 disclose vinylamine containing copolymers by copolymerizing N-vinylformamide and (meth)acrylonitrile and then hydrolyzing the resulting copolymers with an acid. These copolymers are useful as flocculating agents and paper strength increasing agents.

U.S. Pat. No. 5,037,927 discloses copolymers of N-vinylformamide and alkyl(meth)acrylate and their hydrolyzed products.

The above patents disclose copolymers of N-vinylformamide with a nonionic comonomer. Upon hydrolysis, the N-vinylformamide component in the copolymers is converted into a cationic vinylamine component. Thus, the cationic charge on the resultant copolymers will be derived solely from the vinylamine component and accordingly, the charge density of the copolymers is greatly affected by the pH of the medium into which they are added. That is, at low pH, the vinylamine copolymers become protonated and have a labile high cationic charge density and conversely, at high pH, vinylamine copolymers are not fully protonated, and the copolymers will have a substantially reduced cationic charge density. None of the above patents disclose copolymers of N-vinylformamide which derive their cationic charge from pH independent cationic comonomers.

SUMMARY OF THE INVENTION

It is an object of this invention to provide novel copolymers derived from N-vinylamide and certain cationic quaternary amines.

It is another object of this invention to provide novel water-soluble copolymers of N-vinylamide/N-vinylamine/cationic quaternary amines.

It is another object of this invention to provide a novel method of preparing the cationic copolymers described herein.

It is another object of this invention to provide novel polymeric flocculants.

It is another object of this invention to provide a novel drainage/retention aid for use in papermaking systems.

In accordance with the present invention, there have been provided novel water-soluble, cationic copolymers (I) comprising a reaction product of N-vinylamide having the general formula:

$$\begin{array}{c} CH_2=CH \\ | \\ N-R^1 \\ | \\ C=O \\ | \\ R^2 \end{array}$$

and a cationic quaternary amine having the formula:

$$\begin{array}{c} R^3 \\ | \\ CH_2=C \\ | \\ Y \end{array}$$

wherein Y is

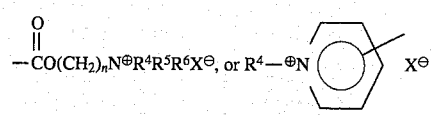

and n is 1 to 5; $R^1$, $R^2$, $R^3$ are independently H or $C_1$ to $C_3$ alkyl, $R^4$, $R^5$ and $R^6$ are independently $C_1$ to $C_3$ alkyl, X is a halide, hydroxyl or $C_1$–$C_3$ alkylsulfate anion.

The present invention further provides certain novel cationic copolymers (II) having the general formula:

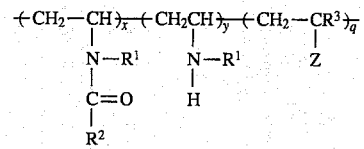

wherein Z represents

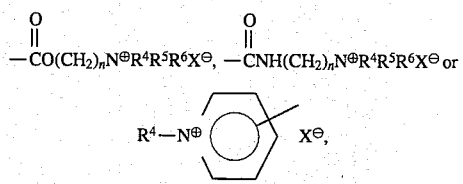

and/or residual groups of $-CH_2N^{\oplus}(R^4R^5)CH_2CH=CH_2X^{\ominus}$, or mixtures thereof and n is 1 to 5, $R^1$, $R^2$ and $R^3$ are independently selected from the group consisting of H or $C_1$ to $C_3$ alkyl, $R^4$, $R^5$ and $R^6$ are independently $C_1$ to $C_3$ alkyl, and X is Cl, Br, I, OH or an alkylsulfate, such as $CH_3SO_4$ and wherein x, y, and q represent molar percents of monomeric units in the copolymer and q is 1 to 99 mol %, the molar ratio of x to y is from 0 to 10 and preferably from 0.033 to 2.8 and the sum of x+y+q is 100 mol %. (It is understood that the subject copolymer may contain small amounts (e.g., up to about 5%) of other copolymerizable monomeric units.)

In accordance with the present invention, there has also been provided a method for preparing the above-described water-soluble cationic copolymers comprising reacting the respective monomers in the presence of a free radical initiator and a water soluble salt of ethylene diaminetetraacetic acid at pH in the range 5 to 8 to form a copolymer and treating the formed copolymer with an organic or inorganic acid or base to transform a portion of the amide moiety to an amine group.

In accordance with the present invention, there has also been provided a method for flocculating suspended matter in aqueous systems by adding to the aqueous system an amount effective to enhance flocculation of a composition comprising the above-described cationic copolymers (I) and/or (II).

Also in accordance with the present invention, there has been provided a drainage/retention aid comprising;

a) microparticles; and b) the above-described cationic copolymers (I) and/or (II).

DETAILED DESCRIPTION

The present invention is directed to novel cationic copolymers (I) which are reaction products of an N-vinylamide with either an ester having a quaternary ammonium moiety or a quaternary alkyl pyridinium group or mixtures thereof. The N-vinylamide is represented by the following structure:

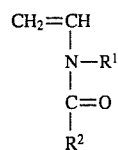   III and the cationic quaternary amine is represented by the general formula:

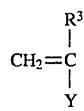   IV wherein

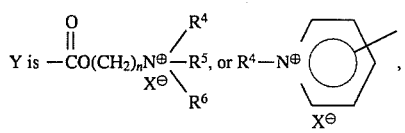

wherein $R^1$, $R^2$, $R^3$ are independently H or $C_1$ to $C_3$ alkyl, $R^4$, $R^5$ and $R^6$ are independently $C_1$ to $C_3$ alkyl, X is a halide, hydroxyl, or $C_1$–$C_3$ alkyl sulfate anion, preferably methylsulfate anion and n is from 1 to 5. Copolymer I shall contain the polymerized units of III and IV in a molar ratio of 1:99 to 99:1 and preferably from 98:2 to 50:50.

The present invention is further directed to novel cationic copolymers (II) which are represented by the formula:

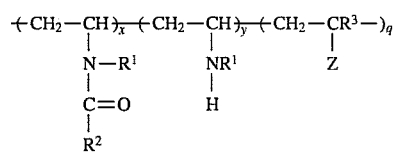

wherein Z represents —C(=O)O(CH$_2$)$_n$ N$^\oplus$R$^4$R$^5$R$^6$X$^\ominus$, —C(=O)NH(CH$_2$)$_n$ N$^\oplus$R$^4$R$^5$R$^6$X$^\ominus$, or

and/or residual groups of CH$_2$N$^\oplus$(R$^4$R$^5$)CH$_2$CH=CH$_2$X$^\ominus$, or mixtures thereof, and n is 1 to 5; $R^1$, $R^2$ and $R^3$ are independently selected from the group consisting of H or $C_1$ to $C_3$ alkyl; $R^4$, $R^5$ and $R^6$ are independently $C_1$ to $C_3$ alkyl; and X is the anion of Cl$^-$, Br$^-$, I$^-$, OH$^-$ or alkylsulfate anion,

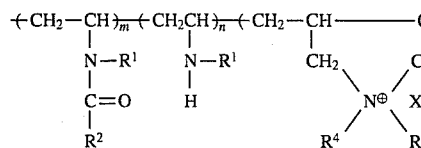

preferably CH$_3$SO$_4^-$; and wherein x, y, and q represent molar percents of monomeric units in the copolymer such that q is 1 to 99 mol %, the molar ratio of x to y is from 0 to 10 and preferably from 0.033 to 2.8 and the sum of x+y+q is 100 mol %. The molar ratio of x+y to q is generally in the range of 99:1 to 1:99, respectively, and is preferably in the range of 98:2 to 50:50. When Z represents —CH$_2$N$^\oplus$(R$^4$R$^5$)CH$_2$CH=CH$_2$ in forming the cationic quaternary amine monomer (CH$_2$=CHZ) which is a diallyl dialkylammonium salt monomer used to form the cationic copolymer II, it is understood that this Z group presents a second ethylenic unsaturation which can further take part in the copolymerization and thereby (i) form part of the same copolymer chain on a head-to-head configuration, (ii) form part of the same copolymer chain on a head-to-tail configuration, (iii) form part of a different copolymer chain, or (iv) remain unreacted. The term "residual of group —CH$_2$N$^\oplus$(R$^4$R$^5$)CH$_2$CH=CH$_2$" or "residual of diallyl dialkylammonium salt" shall mean, in the present description and appended claims, any and all of the residual groups which may be attained with respect to the above-described configurations as part of the resultant cationic copolymer structure.

The novel cationic copolymers (II) of this invention are formed by first reacting an N-vinylamide having the following structure:

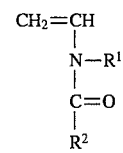   III and at least one cationic quaternary amine having the general formula:

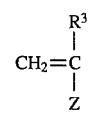   V wherein

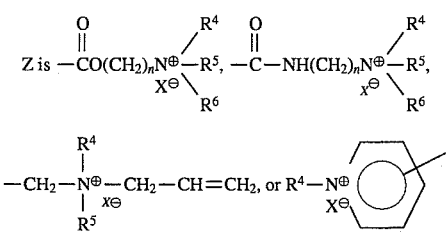

followed by hydrolysis of the formed polymer with an inorganic or organic acid or base. For example, the preferred cationic copolymers (II) are initially formed from N-vinylamide (III) and a cationic quaternary amine (V) wherein at least a portion of monomer V is diallyl dialkylammonium salt, and then either partially or completely hydrolyzed to provide copolymers VI which are represented by the formula:

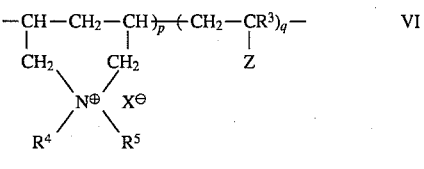   VI wherein Z represents

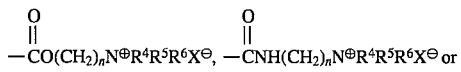

and/or residual groups of —CH$_2$N$^\oplus$(R$^4$R$^5$)CH$_2$CH=CH$_2$X$^\ominus$, or mixtures thereof, and n is 1 to 5, R$^1$, R$^2$ and R$^3$ are independently selected from the group consisting of H or C$_1$ to C$_3$ alkyl; R$^4$, R$^5$ and R$^6$ are independently C$_1$ to C$_3$ alkyl; and X is Cl, Br, I, OH or CH$_3$SO$_4$; and wherein x, y, o, p and q represent molar percents of monomeric units in the copolymer such that the sum of o+p+q is 1 to 99 mol %, preferably from 2 to 50 mol %, the sum of x+y+o+p+q is substantially 100 mol % and the molar ratio of x to y is preferably from 0.033 to 2.8, and most preferably from 0.06 to 1.3.

The copolymers I and II of the present invention may be prepared by first reacting, under reactive conditions, the above N-vinylamide monomers with at least one of the above cationic quaternary amine monomers (CH$_2$=CR$^3$Y) or (CH$_2$=CR$^3$Z), respectively, in the presence of a free radical initiator and a water soluble salt of ethylene diaminetetraacetic acid at a pH in the range 5 to 8. The ratio of N-vinylamide monomer to cationic quaternary amine monomer, on a molar basis, is generally in the range 99:1 to 1:99 respectively, and is preferably in the range 98:2 to 50:50 and more preferably in the range of 98:2 to 75:25.

When at least a portion of the cationic quaternary amine monomer used to form the subject copolymer is a diallyl dialkylammonium salt, the copolymers of the invention may be prepared by first contacting the above N-vinylamide monomers with diallyl dialkylammonium salt monomers having the formula

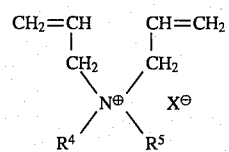

in the presence of a free radical initiator and a water soluble salt of ethylene diaminetetraacetic acid at pH in the range 5 to 8, preferably in the range 6 to 7, to form the copolymer. The ratio of N-vinylamide monomer to diallyl dialkylammonium salt, on a molar basis, is generally in the range 99:1 to 1:99 respectively, and is preferably in the range 98:2 to 50:50 and more preferably in the range of 98:2 to 75:25.

Aqueous solution copolymerization in the presence of a water soluble free-radical initiator is preferred. Suitable free-radical initiators include, but are not limited to, azo initiator, peroxide initiator, persulfate initiators and free-radical redox systems. Especially preferred are water-soluble azo initiators such as 2,2'-azobis(N,N'-dimethyleneisobutyramidine)dihydrochloride, 2,2'-azobis(2-amidinopropane)dihydrochloride, 4,4'-azobis-(4-cyanopentanoic acid), 2,2'-azobis{2-methyl-N[1,1-bis(hydroxymethyl)-2-hydroxyethyl]propionamide}, and 2,2'-azobis[2-methyl-N-(2-hydroxyethyl)propionamide].

The free-radical initiator is usually used in an amount of 0.01 to 10 wt % based on the weight of the total monomers. The copolymerization reaction is usually carried out under an inert gas atmosphere at 30° to 100° C., preferably between 45° to 70° C.

The aqueous solution copolymerization should be carried out in the presence of a water-soluble salt of ethylenediamine tetraacetic acid. The salt can be alkali or alkaline earth metal salts. The salt should be present as part of the aqueous solution in from about 10 to 1,500 parts per million (ppm) of the aqueous reaction solution and preferably from about 50 to 1000 ppm and most preferably at a dosage of from 100 to 500 ppm of the ethylenediamine tetracetic acid. It has been unexpectedly found that when the subject salt is present as part of the copolymerization system, one can obtain high molecular, water soluble copolymers which are not readily attained when normal aqueous phase copolymerization techniques are used.

The molecular weight of the copolymers can be further controlled by various factors in addition to the particular method of copolymerization, which may include the copolymerization temperature, the type and amount of initiator, the concentration of monomers and the like. In general, lower temperature and higher monomer concentration produce a higher molecular weight copolymers while higher temperature and lower monomer concentration produce lower molecular weight copolymers. The monomer concentrations are generally in the range of 5 to 60% by weight, and are preferably between 10 to 30% by weight. The copolymers of the invention generally have molecular weights (as determined by light scattering or equivalent methods) of at least 3,000, and can be as high as 4 million. However, due to solubility and handling considerations, the preferred copolymers of the present invention generally have molecular weights in the range of from 10,000 to 2 million, preferably from 100,000 to 2,000,000 and most preferably from 100,000 to 1,000,000.

The initially formed copolymers are further treated with an acid or base to cause partial or complete hydrolysis to form copolymers II having the following structure:

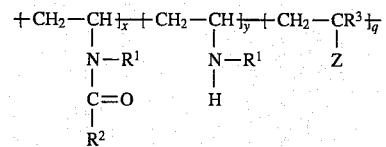

wherein R$^1$, R$^1$, R$^3$, Z and x, y and q have the same meaning as given above. When Z is an ester or amide, a portion may also be hydrolyzed to carboxylic acid or its salt.

The copolymers of this invention, when prepared using a diallyl dialkyl ammonium salt monomer, and hydrolyzed with an acid or a base, form copolymers having the following structure:

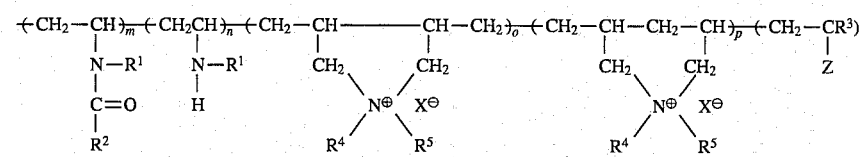

wherein Z represents —C(=O)O(CH$_2$)$_n$ N$^\oplus$R$^4$R$^5$R$^6$X$^\ominus$, —C(=O)NH(CH$_2$)$_n$ N$^\oplus$R$^4$R$^5$R$^6$X$^\ominus$ or

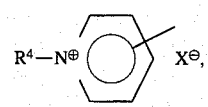

and/or residual groups of —CH$_2$N$^\oplus$(R$^4$R$^5$)CH$_2$CH=CH$_2$X$^\ominus$, or mixtures thereof and n is 1 to 5; R$^1$, R$^2$ and R$^3$ are independently selected from the group consisting of H or C$_1$ to C$_3$ alkyl; R$^4$, R$^5$ and R$^6$ are independently C$_1$ to C$_3$ alkyl; and X is Cl, Br, I, OH or CH$_3$SO$_4$; and wherein x, y, o, p and q represent molar percents of monomeric units in the copolymer such that the sum of o+p+q is 1 to 99 mol %, preferably 2 to 50 mol %, the sum of x+y+o+p+q is substantially 100 mol % and the molar ratio of x to y is preferably from 0,033 to 2.8.

The amount of acid or base used to hydrolyze the copolymers in solution can vary widely and is generally added in a molar ratio of from 0.05:1 to 3:1, preferably from 0.1:1 to 1:1 based on the N-vinylamide monomer content of the initially formed polymeric material. Generally, partial hydrolysis is preferably achieved with a suitable acid such as inorganic acids as, for example, hydrochloric acid, hydrobromic acid, hydrofluoric acid, sulfuric acid, nitric acid, phosphoric acid and the like, although suitable bases, such as inorganic bases as, for example, sodium hydroxide, ammonia, ammonium hydroxide, potassium hydroxide, and the like may also be used. The degree of hydrolysis can be controlled by controlling the amount of acid or base, the reaction temperature and/or the reaction time. In general, greater amounts of acid or base, higher reaction temperatures and longer reaction times result in higher degrees of hydrolysis.

The copolymers (I) and (II) of this invention formed by the reaction of III and IV, as well as by the hydrolyzed reaction product of III and V, have been found to be useful as flocculating agents to agglomerate coagulated colloidal and/or finely divided suspended matter in aqueous or non-aqueous solutions. The copolymers may be added directly to the solutions containing the suspended matter, or may be pre-dissolved in a suitable miscible solvent and then added to the solution. The dosage amount of copolymer is not, per se, critical to the invention, and is generally in an amount effective to flocculate the suspended matter. Those of ordinary skill in the art can readily determine suitable dosage amounts by conventional means. Thus, while the exact dosage amount for a particular system can vary widely depending on the nature of the system and the amount of suspended matter, in general the dosage amount can range from 0,005 to 1 weight percent, preferably from 0.01 to 0.5 weight percent on the basis of the dry weight of the suspended matter.

The copolymers (I) and (II) of this invention have also been found to be particularly useful as drainage/retention aids in pulp and papermaking systems. The copolymers of the invention formed by the reaction of III and IV, as well as by the hydrolyzed reaction product of III and V, when used as a drainage retention aid are added to aqueous pulp suspensions in papermaking systems in combination with microparticles. The microparticles can be added to the pulp in any order and at any point with respect to the polymer addition. The combination of a polymeric flocculating agent together with organic and/or inorganic microparticles is often referred to as a "microparticle system".

Suitable microparticles for use in this embodiment of the present invention generally include organic polymeric particles and/or inorganic colloidal particles having cationic anionic or amphoteric charged surfaces. Inorganic microparticles include, but are not limited to, particulate siliceous materials, china clay, alumina, titanium, zirconium, tin, borium compounds, and the like, and mixtures thereof. The particulate siliceous materials can be selected from water swellable clay materials, colloidal silica solutions, or water dispersible siliceous materials. The water swellable clay materials are primarily smectite or vermiculite type, and are preferably the bentonite type materials. The term "bentonite" generally embraces the sheet silicates that are swellable in water. These are primarily the clay mineral montmorillonite and similar clay minerals, e.g. hectorite, nontronite, saponite, volkonskoite, sauconite, beidellite, allevardite, illite, halloysite, attapulgite and sepiolite. If water swellability is not a natural property of the mineral, it may be activated before being used, i.e., converted to its water-swellable sodium, potassium, lithium, ammonium or hydroxonium form.

Suitable microparticles for use in this invention also include "modified" inorganic particles wherein the ionicity of the inorganic particles is modified by contacting the particles with a low molecular weight (e.g. below 100,000), high charge density (e.g. at least 4 mEq/g) anionic copolymer. This technique is more fully disclosed in U.S. Pat. No. 5,015,334 to Derick which is incorporated herein by reference in its entirety. A preferred modified inorganic particle for use in this invention is a modified bentonite particle which was contacted with an acrylic or methacrylic copolymer.

Suitable organic polymeric microparticles for use in the invention include organic polymeric microparticles which are either water dispersible or water soluble, and have an ionic surface. Organic polymeric microparticles having the above properties include, but are not limited to, various latex particles. An example of suitable organic polymeric microparticles are those commercially available from Cytec Industries under the trade name of POLYFLEX™. Organic polymeric microparticles suitable for the present invention include those described in U.S. Pat. No. 5,171,808 which is incorporated herein by reference in its entirety.

The particle size of the microparticles of this invention is not, per se, critical to the invention provided of course that these particles can disperse or be readily dispersed into an aqueous pulp suspension in a paper making process and which do not negatively affect the surface characteristics of the final paper product. These particles, in general, will have an average dry particle size in the range 1 nm to 50 microns, and more typically from 2 nm to 10 microns.

The copolymers and microparticles of this invention are generally prediluted into separate aqueous solutions which may then be added to an aqueous pulp suspension in any order and at any point in the papermaking process prior to the headbox, either before or after one of the several shear stages. Shear stages include the cleaning, mixing and/or pumping stage. Best results are achieved when the copolymer is added to thin stock rather than to thick stock, and the microparticle solution is preferably added after the copolymer solution. Typically, both components are added close to the head box prior to sheet formation.

The dosage amounts of copolymer and microparticle added to the system can vary widely depending on the nature of the aqueous pulp suspension and the degree of drainage or retention desired. Those of ordinary skill in the art can readily determine appropriate dosage amounts by conventional techniques. Thus, the exact dosage amounts are not critical to the invention, per se, and are generally added in amounts effective to provide enhanced drainage or retention relative to the absence of these materials. Typical dosage amounts of the present copolymers range from 0.005 to 0.5 weight %, preferably from 0.01 to 0.3 weight % and most preferably from 0.02 to 0.1 weight % on the basis of dry pulp. Typical dosage amounts for microparticles range from 0.05 to 3 weight %, preferably from 0.1 to 1.5 weight % and most preferably from 0.2 to 1 weight % on the basis of dry pulp. These ranges generally correspond to weight ratios of copolymer to microparticle in the range 1:10 to 5:1, respectively. In accordance with the present invention, the copolymer and microparticle dispersion can also be added in several increments.

The copolymers of the present invention in combination with an organic polymeric or inorganic microparticle unexpectedly provide a drainage/retention microparticle system which achieves enhanced effectiveness over prior known drainage/retention aids, and also unexpectedly provide a drainage/retention system which does not have the handling and shear problems of the prior art high molecular weight materials. The drainage/retention can be optimized by having the subject copolymers sufficiently hydrolyzed to provide a charge density in the range 1 to 24 mEq/g, preferably 4 to 22 mEq/g, most preferably 10 to 20 mEq/g as determined at pH 4. At these charge densities, the hydrolyzed copolymer expands in size and effectively increases its apparent molecular weight.

In a preferred embodiment, the drainage/retention aids of this invention comprise a combination of an inorganic bentonite microparticle and a copolymer having a molecular weight of at least 100,000 and which has been hydrolyzed to provide a charge density between 4 and 22 mEq/g.

The following examples are provided to illustrate the present invention in accordance with the principles of this invention, but are not to be construed as limiting the invention in any way except as indicated in the appended claims. All parts and percentages are by weight unless otherwise indicated.

EXAMPLE 1

A 250 ml four-neck flask equipped with a stirrer, a condenser, a thermometer combined with a nitrogen gas inlet, and a syringe for addition of initiator solutions was charged with 20.90 g of N-vinylformamide (NVF), 3.00 g of 65% aqueous diallyl dimethylammonium chloride (DADMAC), and 3.75 g of 0.005% aqueous solution of ethylene diaminetetraacetic acid, tetrasodium salt. The solution was adjusted to pH 6.5, purged with nitrogen gas, and then heated to 55° C. while stirring. In a separate flask, a solution containing 20.90 g of NVF, 3.75 g of 0,005% aqueous solution of tetrasodium salt of ethylene diaminetetraacetic acid, 0,131 g of 2,2'-azobis [2-(2-imidazolin-2-yl)propane] dihydrochloride and 116.79 g of water was prepared. This solution was added to the reaction flask via a syringe over an 80-minute period at 55° C.

At this point, high viscosity built up and 30.0 g water was added to the flask. Thereafter, another solution of 0.044 g of 2,2'-azobis [2-(2-imidazolin-2-yl)propane] dihydrochloride in 39.0 g of water was added slowly over 70 minutes. After addition, the reaction solution was maintained at 55° C. for 3 ½ hours, charged with 53.30 g of water and then raised to 65° C. for another 4 hours. NMR measurement of the resulting copolymer showed only a trace amount of the vinyl groups. The weight-average molecular weight $\overline{M}w$) of the copolymer was determined to be 181,000 by gel permeation chromatography (GPC).

EXAMPLE 2

A 100 ml two-neck flask equipped with a condenser and a thermometer was charged with 53.45 g of the copolymer solution from Example 1, 5.33 g of concentrated hydrochloric acid and 21.17 g of water. The solution was then heated to 80° for 8 hours while stirring. Examination of the reaction product showed that it contained 50 mole% NVF, 48 mole % vinylamine (VAm) and 2 mole % DADMAC by NMR and had a $\overline{M}w$ of 745,000 as measured by GPC.

EXAMPLE 3

A 200 ml flask was charged with 68.02 g of the copolymer solution from Example 1, 14.21 g of concentrated hydrochloric acid and 19.80 g of water. The solution was heated to 80° C. for 8 hours while stirring. The composition of the resulting copolymer was 20 mole % NVF, 78 mole % VAm and 2 mole % DADMAC as determined by NMR. The $\overline{M}w$ was 653,000 as measured by GPC.

EXAMPLE 4

A 250 ml flask similar to that of Example 1 was charged with 17.05. g of NVF, 4.97 g of 65% aqueous DADMAC and 6.72 g of 0.005% aqueous solution of ethylenediaminetetracetic acid, tetrasodium salt. The solution was adjusted to pH≈6.5, purged with nitrogen gas and then heated to 55° C. while stirring. In a separate flask, a solution of NVF, 0.112 g of 2,2'-azobis [2-(2-imidazolin-2-yl) propane] dihydrochloride and 105.56 g of water was prepared and then added to the flask over a 90-minute period. Thereafter, another solution of 0.037 g of 2,2'-azobis [2-(2-imidazolin-2-yl) propane] dihydrochloride in 45.19 g of water was added slowly over 60 minutes. After addition, the reaction solution was maintained at 55° C. for 3½ hours, charged with 25.0 g of water and then raised to 65° for another 4 hours. The $\overline{M}w$ of the resultant copolymer was determined to be 344,000 by GPC.

EXAMPLE 5

Into a 100 ml flask were charged 44.36 g of the copolymer solution from Example 4, 4.93 g of concentrated hydrochloric acid and 25.40 g of water. The solution was then heated to 80° C. for 8 hours while stirring. Examination of the reaction product showed that it contained 48 mole % NVF, 48 mole % VAm and 4 mole % DADMAC by NMR and had a $\overline{M}w$ of 965,000 as measured by GPC.

EXAMPLE 6

Into a 200 ml flask were charged 53.23 g of the copolymer solution from Example 4, 11.93 g of concentrated hydrochloric acid and 24.47 g of water. The solution was heated to 80° C. for 8 hours while stirring. Examination of the reaction product showed that it contained 18 mole % NVF, 78 mole % VAm and 4 mole % DADMAC by NMR and had a $\overline{M}w$ of 866,000 as measured by GPC.

EXAMPLE 7

A 200 ml flask similar to that of Example 4 was charged with 10.89 g of NVF, 9.95 g of 65% aqueous DADMAC, 3.55 g of 0.005% aqueous solution of tetrasodium salt of ethylenediaminetetraacetic acid, and 1.50 g of water. The solution was adjusted to pH≅6.5, purged with nitrogen gas and then heated to 55° C. while stirring. In a separate flask, a solution containing 21.78 g of NVF, 0.117 g of 2,2'-azobis [2-(2-imidazolin-2-yl) propane] dihydrochloride and 63.20 g of water was prepared. This solution was added to the reaction flask over 70 minutes at 55° C. Thereafter, another solution of 0.039 g of 2,2'-azobis [2-(2-imidazolin-2-yl) propane] dihydrochloride and 36.83 g of water was added slowly over 50 minutes. After addition, the reaction was continued at 55° C. for another 8 hours. The M̄w of the resultant copolymer was determined to be 766,000 by GPC.

EXAMPLE 8

Into a 200 ml flask were charged 29.59 g of the copolymer solution from Example 7, 9.53 g of concentrated hydrochloric acid and 39.20 g of water. The solution was then heated to 80° while stirring. Examination of the reaction product showed that it contained 12 mole % NVF, 80 mole % VAm and 8 mole % DADMAC by NMR and had a M̄w of 962,000 as measured by GPC.

EXAMPLE 9

A 100 ml flask similar to that of Example 2 was charged with 6.39 g of NVF, 14.92 g of 65% aqueous DADMAC, 2.56 g of 0.005% aqueous solution of tetrasodium salt of ethylenediaminetetraacetic acid and 7.0 g of water. The solution was adjusted to pH≅6.5, purged with nitrogen gas and then heated to 55° C. while stirring. In a separate flask, a solution containing 6.40 g of NVF, 0,090 g of 2,2'-azobis[2-(2-imidazolin-2-yl) propane] dihydrochloride and g of water was prepared. This solution was added to the reaction flask over 90 minutes at 55° C. After addition, the reaction was continued at 55° C. for another 8½ hours.

NMR measurements indicated the presence of about 5% of the allyl groups of the DADMAC in the reaction product. The M̄w of the resultant copolymer was determined to be 384,000 GPC.

EXAMPLE 10

Comparative Synthesis of NVF-DADMAC Copolymer

A 200 ml flask similar to that of Example 1 was charged with 12.79 g of NVF, 14.92 g of 65% aqueous DADMAC, 0,090 g of 2,2'-azobis[2-(2-imidazolin-2-yl) propane] dihydrochloride and 97.14 g of water. The pH of the solution was 8.5. The solution was purged with nitrogen gas and then heated to 55° C. for 10 hours while stirring in a nitrogen atmosphere.

NMR measurements indicated that about 80% of the allyl groups of the DADMAC monomer remained uncopolymerized in the reaction product. The viscosity of the reaction solution was also negligibly low.

EXAMPLE 11

A bleached kraft pulp containing 30% ground calcium carbonate with consistency around 0.5% and pH 8 was used in the standard dynamic Britt jar for retention test. Copolymers shown in the previous examples were added to the stock on dry paper weight basis. The first pass retention of fines and fillers are reported in Table 1.

TABLE 1

| Copolymers | 0.03% Copolymer | 0.06% Copolymer |
|---|---|---|
| Example 3 | 65.8% | 71.4% |
| Example 8 | 94% | 90% |
| No Copolymer | | 26% |

EXAMPLE 12

The stock was similar to that of Example 11. The microparticle used was bentonite.

TABLE 2

| Copolymers | 0.03% Copolymer | 0.06% Copolymer | 0.06% Copolymer + 0.3% Microparticle |
|---|---|---|---|
| Example 2 | 89.4% | 89% | 94.2% |
| Example 5 | 90.3% | 81.8% | 83.3% |
| No Copolymer | | 24.2% | |

EXAMPLE 13

A bleach kraft stock with consistency about 0.5% and pH 5 was used without any filler. The microparticle used was bentonite.

TABLE 3

| Copolymers | 0.03% Copolymer | 0.06% Copolymer | 0.06% Copolymer + 0.3% Microparticle |
|---|---|---|---|
| Example 2 | 64.2% | 69.2% | 78.8% |
| Example 5 | 63.3% | 69% | 91.9% |
| Example 8 | 67.5% | 65.1% | 77.5% |
| No Copolymer | | 59.7% | |

EXAMPLE 14

A bleached kraft stock containing 30% ground calcium carbonate as filler was used in the drainage test. The pH of the stock was 8, with consistency around 0.5%. In the drainage test, 1 liter stock was used and copolymers and microparticle (bentonite) was added in sequence to the stock. The liquid volume collected from the tester was reported as freeness in milliliter.

TABLE 4

| Copolymers | 0.06% Copolymer | 0.06% Copolymer + 0.3% Microparticle |
|---|---|---|
| Example 3 | 510 ml | 600 ml |
| Example 6 | 485 ml | 580 ml |
| Example 8 | 460 ml | 585 ml |
| No Copolymer | 410 ml | |

EXAMPLE 15

Similar stock to the previous example was used in the drainage test.

TABLE 5

| Copolymers | 0.06% Copolymer | 0.06% Copolymer + 0.3% Microparticle |
|---|---|---|
| Example 2 | 460 ml | 585 ml |
| Example 5 | 450 ml | 585 ml |
| No Copolymer | 410 ml | |

EXAMPLE 16

A bleached kraft stock containing no filler was used in the drainage test. The pH of the stock was 5, with consistency of around 0.5%.

TABLE 6

| Copolymers | 0.06% Copolymer | 0.06% Copolymer + 0.3% Microparticle |
|---|---|---|
| Example 2 | 380 ml | 490 ml |
| Example 5 | 370 ml | 490 ml |
| Example 8 | 400 ml | 500 ml |
| No Copolymer | | 320 ml |

We claim:

1. A method of flocculating coagulated and/or finely divided suspended matter in aqueous systems comprising adding to the system from 0.005 to 1 weight percent based on the dry weight of the coagulated and/or finely suspended matter of a water soluble cationic copolymer composed of the polymerization reaction of an N-vinylamide having the general formula:

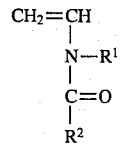

with at least one cationic quaternary amine monomer of the general formula:

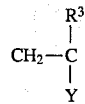

wherein

Y represents $-C(=O)O(CH_2)_n N^{\oplus} R^4 R^5 R^6 X^{\ominus}$,

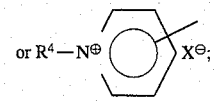

n is 1 to 5;

$R^4$, $R^5$ and $R^6$ are independently $C_1$ to $C_3$ alkyl; and X is a halide, hydroxyl or alkylsulfate anion.

2. The method of claim 1 wherein the water soluble copolymer has a molar ratio of N-vinylamide groups to cationic quaternary amine groups of from about 98:2 to 50:50.

3. The method of claim 2 wherein the water soluble copolymer has a weight average molecular weight of at least 3,000.

4. The method of claim 2 wherein the water soluble copolymer has a weight average molecular weight of at least 100,000.

5. The method of claim 1 wherein the $R^1$ and $R^2$ groups are each hydrogen.

6. The method of claim 2 wherein the $R^1$ and $R^2$ groups are each hydrogen.

7. The method of claim 1, 2, 4 or 6 wherein the polymer has a cationic charge density of from 4 to 22 mEq/g.

8. The method of claim 1 wherein the molar ratio of x to y is from 0.033 to 2.8.

* * * * *